United States Patent
Kegel et al.

(10) Patent No.: US 8,719,464 B2
(45) Date of Patent: May 6, 2014

(54) EFFICIENT MEMORY AND RESOURCE MANAGEMENT

(75) Inventors: Andrew Kegel, Redmond, WA (US);
Mark Hummel, Franklin, MA (US);
Anthony Asaro, Toronto (CA); Phillip Ng, Toronto (CA)

(73) Assignee: Advanced Micro Device, Inc., Sunnyvale, CA (US)

( * ) Notice: Subject to any disclaimer, the term of this patent is extended or adjusted under 35 U.S.C. 154(b) by 167 days.

(21) Appl. No.: 13/308,211

(22) Filed: Nov. 30, 2011

(65) Prior Publication Data
US 2013/0138840 A1 May 30, 2013

(51) Int. Cl.
*G06F 13/28* (2006.01)
*G06F 21/00* (2013.01)

(52) U.S. Cl.
USPC .................................................. 710/22; 711/6

(58) Field of Classification Search
None
See application file for complete search history.

(56) References Cited

U.S. PATENT DOCUMENTS

2008/0288468 A1* 11/2008 Schirmer et al. .................. 707/3
2011/0125951 A1* 5/2011 Youngworth ..................... 711/6

OTHER PUBLICATIONS

John Wiley, Definition of 'pointer', 1998.*
International Search Report and Written Opinion, mailed Feb. 26, 2013, for PCT Patent Appl. No. PCT/US2012/065860, 8 pages.
"AMD I/O Virtualization Technology (IOMMU) Specification—PID 34434—Rev 1.26," Company website, Feb. 1, 2009, Retrieved from the Internet at URL:http://support.amd.com/dc/Embedded_TechDocs/34434-IOMMU-Rev 1.26 2-11-09.pdf [retrieved on Mar. 6, 2012], 90 pages.

* cited by examiner

*Primary Examiner* — Hyun Nam
(74) *Attorney, Agent, or Firm* — Sterne, Kessler, Goldstein & Fox P.L.L.C.

(57) ABSTRACT

The present system enables passing a pointer, associated with accessing data in a memory, to an input/output (I/O) device via an input/output memory management unit (IOMMU). The I/O device accesses the data in the memory via the IOMMU without copying the data into a local I/O device memory. The I/O device can perform an operation on the data in the memory based on the pointer, such that I/O device accesses the memory without expensive copies.

12 Claims, 7 Drawing Sheets

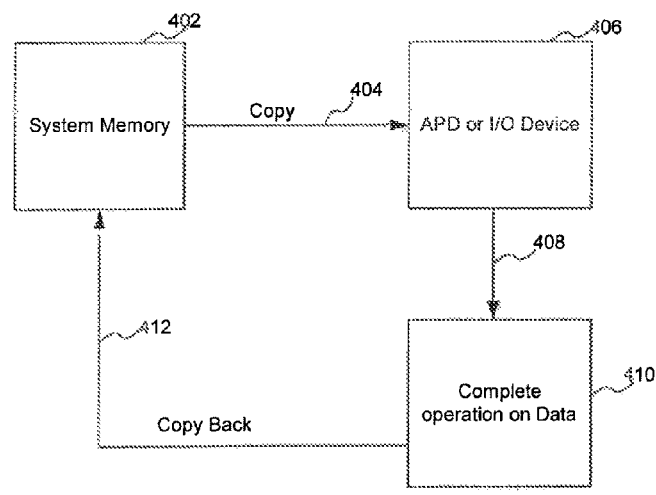
FIG. 4
(Conventional)

EFFICIENT MEMORY AND RESOURCE MANAGEMENT

BACKGROUND

1. Field of the Invention

The present invention is generally directed to computing systems. More particularly, the present invention is directed to the sharing of a virtual address space within a computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available only for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of the CPU and CPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) efficient scheduling, (ii) providing quality of service (QoS) guarantees between processes, (iii) programming model, (iv) compiling to multiple target instruction set architectures (ISAs), and (v) separate memory systems,—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In another example, some images stored in memory accessed by multiple processors may not be stored at a desired level of quality. For example, picture quality, contrast, orientation (e.g., rotation), etc. of the images may be incorrect. Typically, if there is image data residing in memory that needs manipulation prior to being displayed, this image data has to be copied to the I/O device's memory where it can be manipulated, and then copied back to memory so that they can be printed. This process is time-consuming and, for example, can reduce the quality of stored image data.

SUMMARY

Therefore, what is needed is an efficient manner to store for multiple processors to access data stored in a shared memory.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

More specifically, embodiments of the present invention relate to methods, systems, and computer readable media for IOMMU efficient memory and resource management. In one embodiment, a pointer associated with accessing data in a memory, is passed to an input/output (I/O) device via an input/output memory management unit (IOMMU). The I/O device accesses the data in the memory via the IOMMU without copying the data into a local I/O device memory. The I/O device performs an operation on the data in the memory based on the pointer.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 4 is a block diagram of a conventional memory and I/O device relationship in which embodiments of the present invention can be applied.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
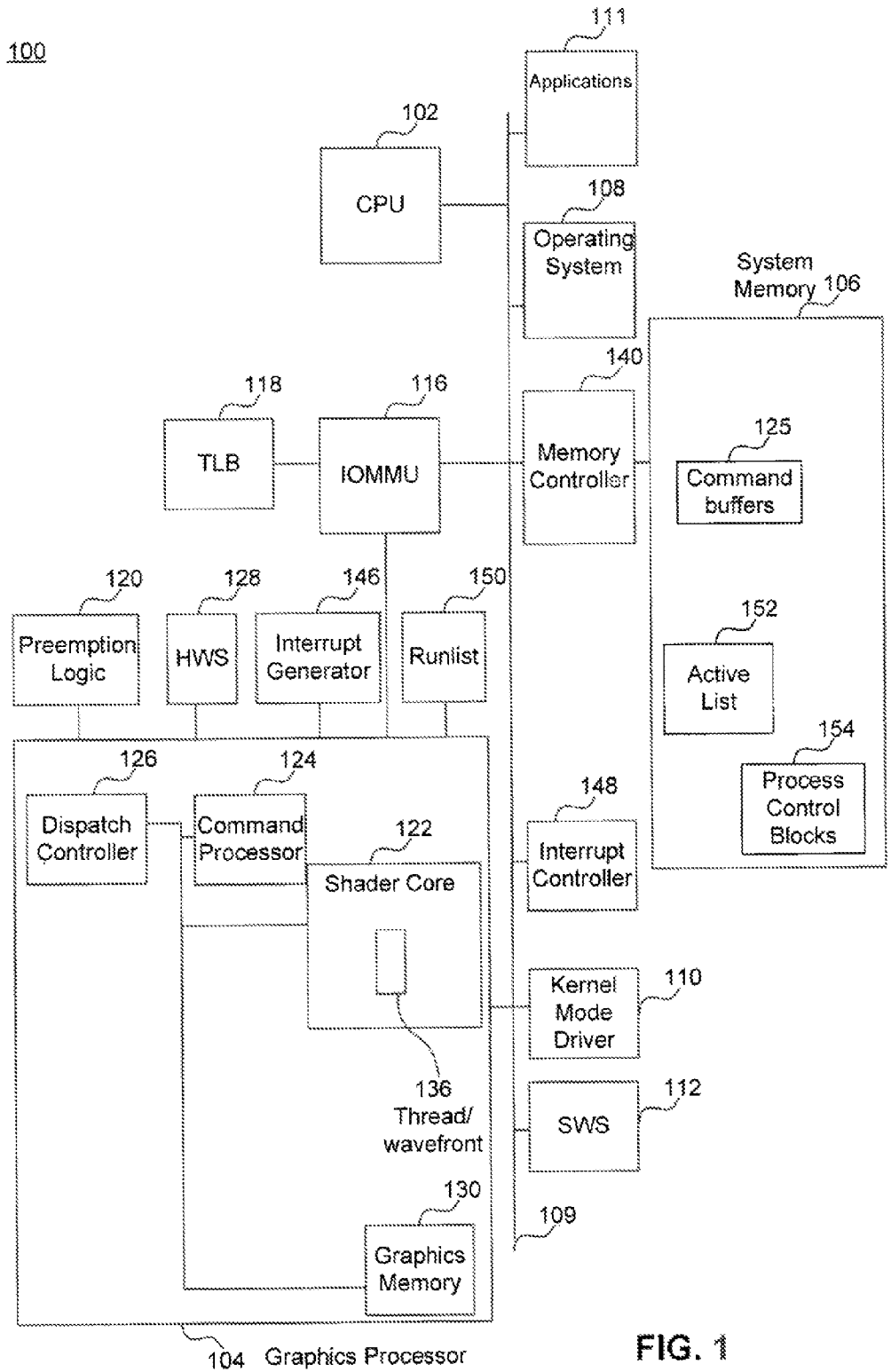
FIG. 1 is an illustrative block diagram of a processing system in accordance with embodiments of the present invention.

FIG. 1 is an exemplary illustration of a unified computing system 100 including a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system (OS) 108, and a communication infrastructure 109. The OS 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface. Device drivers, particularly on modern Windows platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user modules only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the OS 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations, based on commands or instructions received from CPU 102.

For example, commands can be considered a special instruction that is not defined in the instruction set architecture (ISA) and usually accomplished by a set of instructions from a given ISA or a unique piece of hardware. A command may be executed by a special processor such as a dispatch processor, command processor, or network controller. On the other hand, instructions can be considered, e.g., a single operation of a processor within a computer architecture. In one example, when using two sets of ISAs, some instructions are used to execute x86 programs and some instructions are used to execute kernels on APD/GPU compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more single instruction multiple data (SIMD) processing cores. As referred to herein, a SIMD is a math pipeline, or programming model, where a kernel is executed concurrently on multiple processing elements each with its own data and a shared program counter. All processing elements execute a strictly identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD/GPU compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a single SIMD engine can be referred to as a wavefront 136. The width of a wavefront is a characteristic of the hardware SIMD engine. As referred to herein, a workgroup is a collection of related work-items that execute on a single compute unit. The work-items in the group execute the same kernel and share local memory and workgroup barriers.

All wavefronts from a workgroup are processed on the same SIMD engine. Instructions across a wavefront are issued one at a time, and when all work-items follow the same control flow, each work-item executes the same program. An execution mask and work-item predication are used to enable divergent control flow within a wavefront, where each individual work-item can actually take a unique code path through the kernel. Partially populated wavefronts can be processed when a full set of work-items is not available at wavefront start time. Wavefronts can also be referred to as warps, vectors, or threads.

Commands can be issued one at a time for the wavefront. When all work-items follow the same control flow, each work-item can execute the same program. In one example, an execution mask and work-item predication are used to enable divergent control flow where each individual work-item can actually take a unique code path through a kernel driver. Partial wavefronts can be processed when a full set of work-items is not available at start time. For example, shader core 122 can simultaneously execute a predetermined number of wavefronts 136, each wavefront 136 comprising a predetermined number of work-items.

Within the system 100, APD 104 includes its own memory, such as graphics memory 130. Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or (n) number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or (n) number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the OS 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and a final state. An initial state is a starting point for a machine to process an input data set according to a program in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102. The term "processing logic" or "logic," as used herein, refers to control flow commands, commands for performing computations, and commands for associated access to resources.

During execution, respective applications, OS functions, processing logic commands, and system software can reside in memory 106. Control logic commands fundamental to OS 108 will generally reside in memory 106 during execution. Other software commands, including, for example, KMD 110 and software scheduler 112 can also reside in memory 106 during execution of system 100.

in this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context (sometimes referred to as process) can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects. On the other hand, process can be considered the execution of a program for an application will create a process that runs on a computer. The OS can create data records and virtual memory address spaces for the program to execute. The memory and current state of the execution of the program can be called a process. The OS will schedule tasks for the process to operate on the memory from an initial to final state.

Referring back to the example shown in FIG. 1, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, OS 108 includes functionality to manage the hardware components of system 100 and to provide common services. In various embodiments, OS 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, OS 108 invokes an appropriate interrupt handling routine. For example, upon detecting a page fault interrupt, OS 108 may invoke an interrupt handler to initiate loading of the relevant page into memory 106 and to update corresponding page tables.

OS 108 may also include functionality to protect system 100 by ensuring that access to hardware components is mediated through OS managed kernel functionality. In effect, OS 108 ensures that applications, such as applications 111, run on CPU 102 in user space. OS 108 also ensures that applications 111 invoke kernel functionality provided by the OS to access hardware and/or input/output functionality.

By way of example, applications 111 include various programs or commands to perform user computations that are also executed on CPU 102. The unification concepts can allow CPU 102 to seamlessly send selected commands for processing on the APD 104. Under this unified APD/CPU framework, input/output requests from applications 111 will be processed through corresponding OS functionality.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, OS, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1. For example, computing system 100 can include one or more input interfaces, non-volatile storage, one or more output interfaces, network interfaces, and one or more displays or display interfaces.

Figure 2:
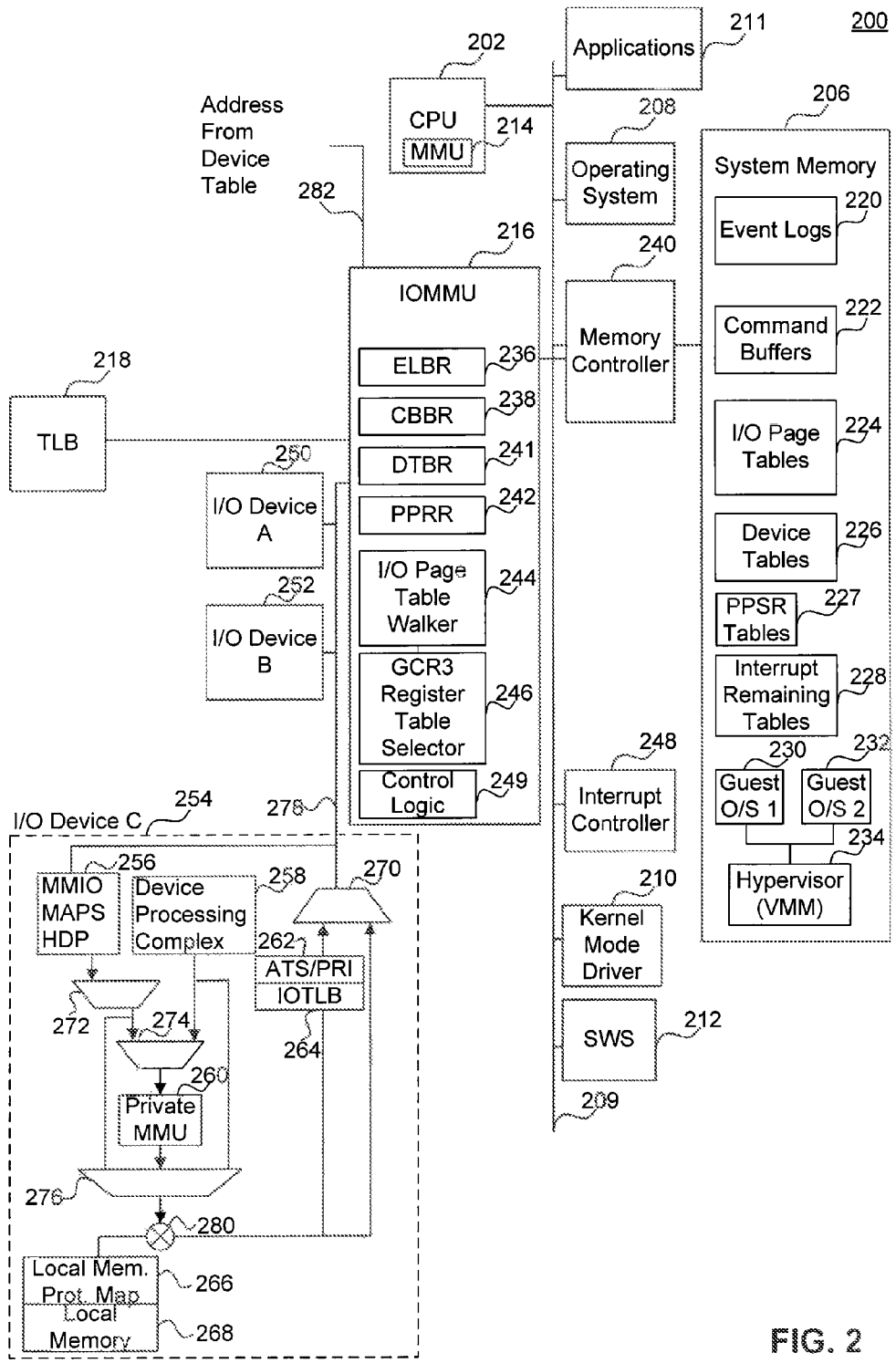
FIG. 2 is an block diagram illustration of the APD illustrated in FIG. 1.

FIG. 2 is a block diagram 200 illustrating I/O device interfacing architecture comprising a CPU 202, and memory 206, and also illustrating a more detailed view of FIG. 1. FIG. 2 further illustrates memory mapping structure configured to operate between the memory 206, the IOMMU 216, and the I/O devices A, B, and C, represented by numerals 250, 252, and 254, respectively, connected via bus 278. IOMMUs, such as the IOMMU 216, can be hardware devices that operate to translate direct memory access (DMA) virtual addresses into system physical addresses. Generally, IOMMUs such as the IOMMU 216 construct one or more unique address spaces and use the unique address space(s) to control how a device's DMA operation accesses memory. While FIG. 2 only shows one IOMMU for sake of example, embodiments of the present invention can include more than one IOMMU.

Generally, an IOMMU can be connected to its own respective bus and I/O device(s). In FIG. 2, a bus 209 may be any type of bus used in computer systems, including a PCI bus, an AGP bus, a PCI-E bus (which is more accurately a point-to-point interconnect), or any other type of bus or communications channel whether presently available or developed in future. Bus 209 may further interconnect interrupt controller 248, KMD 210, SWS 212, applications 211, and OS 208 with other components in system 200. Further, interconnect interrupt controller 248, KMD 210, SWS 212, applications 211, and OS 208 are substantially similar to interconnect interrupt controller 148, KMD 110, SWS 112, applications 111, and OS 108, as described herein, and are not described again.

The I/O devices which may be connected to IOMMU 216 are further illustrated in FIG. 2. The I/O devices interfacing architecture includes I/O devices A, B, and C, represented by element numbers 250, 252, and 254. The I/O device C also includes memory management I/O (MMIO) maps and host data path (HDP) 256 device processing complex 258, private MMU 260, IOTLB 264, address translation service (ATS)/peripheral request interface (PRI) request block 262, local memory 268, local memory protection map 266, and multiplexers 270, 272, 274, and 276.

The I/O devices A, B, and C are representative of many types of I/O devices including but not limited to APDs, expansion cards, peripheral cards, network interface controller (NIC) cards with extensive off-load capabilities, WAN interface cards, voice interface cards, and network monitoring cards. More than one I/O device may be connected to each IOMMU through various bus configurations.

The system 200 illustrates high level functionality of the system, and the actual physical implementation may take many forms. For example, the MMU 214 is commonly integrated into each processor 202. The example illustrated in FIG. 2 may be based on the HyperTransport™ (HT) coherent fabric between processor 202's nodes and an HT I/O link between processor 202's nodes and I/O device 250, 252, and 254 or any I/O hubs (not shown) that bridge to other I/O devices' interconnects.

Alternatively, any other coherent interconnect may be used between processor 202's nodes and/or any other I/O interconnect may be used between processor nodes and the I/O devices. Furthermore, another example may include processor 202 coupled to a northbridge, which is further coupled to memory 206 and one or more I/O interconnects, in a traditional PC design.

Any of I/O devices 250, 252, and 254 may issue a DMA operation (i.e. interrupt) that flows upwards through the IOMMU 216 where the DMA operation gets processed. Then the flow continues to the processor 202 which can include the memory controller 214 embedded therein.

At the time of connection of an I/O device, if the IOMMU 216 is detected, software initiates a process of establishing the necessary control and data structures. For example, when IOMMU 216 is set up, the IOMMU 216 can include device table base register (DTBR) 241, command buffers base register (CBBR) 238, event log base register (ELBR) 236, control logic 249, and peripheral page request register (PPRR) 242. Further, during initial set-up, the IOMMU 216 can include an operator 246 for selecting the appropriate guest page table's base pointer register table. The base pointer register table can be, for example, a control register 3 (CR3) which is used by an x86 microprocessor process to translate physical addresses from virtual addresses by locating both the page directory and page tables for current tasks.

A guest CR3 (GCR3) change can establish a new set of translations and therefore the processor may automatically invalidate TLB 218 entries associated with the previous context. The GCR3 register operates to commence I/O page table walker 244, if necessary, as discussed in U.S. Patent Application No. 61/423,062, entitled "Input/Output Memory Management Unit Two-Layer Addressing," which is hereby incorporated by reference in its entirety. Also, the IOMMU 216 can be associated with one or more TLBs 218 for caching address translations that are used for fulfilling subsequent translations without needing to perform a page table walk. Addresses from a device table can be communicated to IOMMU 216 via bus 282.

Once the data structures are set up, the IOMMU 216 may begin to control DMA operation access, interrupt remapping, and address translation.

The IOMMU 216 can use memory management I/O (MMIO) to indicate two-level translation is supported. When two-level translation is determined to be supported, the two-level translation is activated by programming the appropriate device table entries (DTE).

In nested paging, transactions associated with the DTE can include page table root pointers which point to the root of the data structures for I/O page tables 224 in memory 206.

Accordingly, the IOMMU 216 can use a mapped guest pointer to access I/O page tables by extending the device table entry to include GVA-to-GPA address translations. The GVA-to-GPA translation may be managed by the guest OS (hereinafter, "L1" translation).

Further, the IOMMU 216 may use a mapped system pointer to access I/O page tables to perform GPA-to-SPA translations. The GPA-to-SPA translation can be managed by the hypervisor 234 (hereinafter, "L2" translation).

Accordingly a DTE comprising both types of pointers may be used to perform two layers of cascaded address translation walks.

The nested address space created by the L2 and L1 translation process allows for advance computation architectures in virtualization systems such as compute offload, user-level I/O, and accelerated I/O devices.

As illustrated in FIG. 2, IOMMU 216 is connected between memory 206 and I/O devices 250, 252, and 254. Further, IOMMU 216 can be located on a separate chip from the memory 206, memory controller 240, and I/O devices 250, 252, and 254. The IOMMU 216 may be designed to manage major system resources and can use I/O page tables 224 to provide permission checking and address translation on memory accessed by I/O devices. Also, I/O page tables may be designed in the AMD64 Long format. The device tables 226 allow I/O devices to be assigned to specific domains. The I/O page tables 224 also may be configured to include pointers to the I/O devices' page tables.

IOMMU 216 can be configured to thwart malicious DMA requests as a security and permission checking measure by remapping the unpermitted DMA requests. Further, regarding interrupt remapping, IOMMU 216 can also be configured to (i) redirect DMA requests to the correct memory locations and (ii) redirect DMA requests to the correct virtual or physical CPUs running the guest VMs. The IOMMU 216 also efficiently manages secure direct assignment of I/O devices. The IOMMU 216 further uses interrupt remapping tables to provide permission checking and interrupt remapping for I/O device interrupts In one embodiment, the IOMMU 216 includes a guest virtual advanced programmable interrupt controller (APIC) construct (not shown). Another embodiment includes an IOMMU having architectural features designed to support the virtualized guest APIC.

The IOMMU 216 supports the delivery of interrupts directly to one or more concurrently running guests (e.g. guest VMs) without hypervisor intervention. In other words, the IOMMU 216 can provide translation services without the need of hypervisor 234. An exemplary IOMMU 216 signals interrupts using standard PCI INTx, MSI, or MSI-X interrupts.

System 200 also includes memory 206, which includes additional memory blocks (not shown). A memory controller 240 can be on a separate chip or can be integrated in the processor 202 silicon. Memory 206 is configured such that DMA and processor activity communicate with memory controller 240.

Memory 206 includes I/O page tables 224, device tables 226, interrupt remapping table (IRT) 228, command buffers 222, event logs 220, and a host translation module such as hypervisor 234. Memory 206 can also include one or more guest OSs running concurrently, such as guest OS 1, represented by numeral 230, and guest OS 2 (232). Hypervisor 234 and guest OSs 230 and 232 are software constructs that work to virtualize the system.

The guest Oss, such as guest OS 230 and guest OS 232, are more directly connected to I/O devices such as I/O devices 250, 252, and 254 in the system 200 because the IOMMU 216, a hardware device, is permitted to do the work that the hyper visor 234, under traditional approaches, would otherwise have to do.

Further, the IOMMU 216 and the memory 206 may be initialized such that DTBR 241 points to the starting index of device table 226. Further, CBBR 238 is associated with the starting index of command buffers 222 such that the IOMMU 216 can read and consume commands stored in the command buffer 222. The ELBR 236 points to the starting index of event logs 220. PPRR 242 points to the starting index of peripheral page service request (PPSR) tables 227.

The IOMMU 216 uses memory-based queues for exchanging command and status information between the IOMMU 216 and the system processor(s), such as CPU 202. The command queue is represented by command buffers 222 in FIG. 2. The command buffer 222 and event logs 220 are implemented by each active IOMMU 216. Also, each IOMMU 216 may implement an I/O page service request queue.

When enabled, the IOMMU 216 intercepts requests arriving from downstream devices (which may be communicated using, for example, HyperTransport™ link or PCI-based communications), performs permission checks and address translation on the requests, and sends translated versions upstream via the HyperTransport™ link to memory 206 space. Other requests may be passed through unaltered.

The IOMMU 216 can read from tables in memory 206 to perform its permission checks, interrupt remapping, and address translations. To ensure deadlock free operation, memory accesses for device tables 226, I/O page tables 224, and interrupt remapping tables 228 by the IOMMU 216 use an isochronous virtual channel and may only reference addresses in memory 206.

Other memory reads originated by the IOMMU 216 to command buffers 222, event log entries 220, and optional request queue entries (not shown) can use the normal virtual channel.

System performance may be substantially diminished if the IOMMU 216 performs the full table lookup process for every device request it handles. Implementations of the IOMMU 216 are therefore expected to maintain internal caches for the contents of the IOMMU 216's in-memory tables. During operation, IOMMU 216 can use system software to send appropriate invalidation commands as it updates table entries that were cached by the IOMMU 216.

The IOMMU 216 writes to the event logs 220 in memory 206 with the ability to use the normal virtual channel. The IOMMU 216 can optionally write to a peripheral page service request queue 227 in memory 206. Writes to a peripheral page service request queue 227 in memory also can use the normal virtual channel.

The IOMMU 216 provides for a request queue in memory to service peripheral page requests while the system processor CPU 202 uses a fault mechanism. Any of I/O devices 250, 252, and 254 can request a translation from the IOMMU 216 and the IOMMU 216 may respond with a successful translation or with a page fault.

In embodiments of the present invention, the IOMMU 216 can support two-level address translation for nested page tables, which are managed according the page tables. Example guest translations are directly compatible with AMD64 long page tables supporting 4 K byte, 2 M byte, and 1 G byte pages.

The IOMMU 216 handles requests for memory access and is implemented such that memory protections permit the IOMMU 216 to share translation table data. This translation table date can include nested page table data used by the IOMMU 216 and/or MMU 214. IOMMU 216 can also be implemented such that sharing of translation tables is not permitted between the IOMMU 216 and the MMU 214.

Host OSs may also perform translations for I/O device-initiated accesses. While the IOMMU 216 translates memory addresses accessed by I/O devices, a host OS may set up its own page tables by constructing I/O page tables that specify the desired translation. The host OS may make an entry in the device table pointing to the newly constructed I/O page tables and can notify the IOMMU of the newly updated device entry. At this point, the corresponding IOMMU I/O tables (e.g., from graphics or other I/O devices) and the host OS I/O tables may be mapped to the same tables.

Any changes the host OS performs on the page protection or translation may be updated in both the processor I/O page tables and the memory I/O page tables.

The IOMMU 216 is configured to perform I/O tasks traditionally performed by exemplary hypervisor 234. This arrangement eliminates the need for hypervisor intervention for protection, isolation, interrupt remapping, and address translation. However, when page faults occur that cannot be handled by IOMMU 216, IOMMU 216 may request intervention by hypervisor 234 for resolution. However, once the conflict is resolved, the IOMMU 216 can continue with the original tasks, again without hypervisor intervention.

Hypervisor 234, also known as virtual machine monitor (VMM), uses the nested translation layer to separate and isolate guest VMs 230 and 232. I/O devices such as I/O devices 250, 252, and 254 can be directly assigned to any of the concurrently running guest VMs such that I/O devices 250, 252, and 254 are contained to the memory space of any one of the respective VMs. Further, I/O devices, such as I/O devices 250, 252, and 254 are unable to corrupt or inspect memory or other I/O devices belonging to the hypervisor 234 or another VM. Within a guest VM, there is a kernel address space and several process (user) address spaces. Using nested translation information, without using the guest translation layer, an I/O device can be granted kernel privileges so that it has relatively free access to the entire contents of the guest VM memory.

To enable user-level (process) I/O and advanced computation models, the guest translation layer is implemented for separation and isolation of guest processes and I/O. Using guest translation in the IOMMU 216, any of the I/O devices can be directly assigned to a process in a guest VM or an I/O device, such as APD 104 or I/O devices 250, 252, and 254, and can run computations in the same address space as a user process. The process address space can be identified to the IOMMU 216 so that the proper translation tables will be used. That is, each memory transaction can be tagged with a process address space ID (PASID). More specifically, an example PASID may be used to identify the application address space within an x86-canonical guest VM. The PASID can be used on an I/O device, such as I/O devices 250, 252, and 254, to isolate concurrent contexts residing in shared local memory 268.

A device ID can be used by IOMMU 216 to select the nested mapping tables for an address translation or interrupt remapping operation. Together, PASID and device ID are used to uniquely identify an application address space.

In a system that connects an I/O device using an I/O bus, a bus protocol can be extended to carry the originating PASID as well as device ID, address, and access type. In a PCI-SIG PCI-E specification, a PASID transaction layer packet (TLP) prefix of the bus packet carries the PASID information which can then used by the IOMMU 216 to select the appropriate guest CR3 GCR3 table, as represented by element number 246, and as discussed in the aforementioned U.S. Patent Application No. 61/423,062. This ensures memory isolation among processes and VMs.

In systems that integrate I/O devices onto the processor die, it is unnecessary to use an I/O bus to connect I/O devices to memory. In these cases, the PASID can simply be carried on wires or as a tag between the integrated I/O devices and the integrated IOMMU. For software compatibility, it is recommended that integrated I/O devices emulate ATS behavior and semantics. In either case, memory isolation is ensured among process and VMs.

Sophisticated, multi-context I/O devices that include local memory, such as local memory 268 for performance or security, may offer the same memory isolation and separation guarantees provided by the IOMMU 216.

For the general architecture of such a device, reference is again made to FIG. 2, illustrating the system element CPU 202 and the IOMMU 216. Many parts of the I/O devices are optional so multiplexers 270, 272, 274, and 276 are shown where functions may be by-passed. For example, an access to the system address space may either flow through an IOTLB 264 working with an ATS/PRI unit 262, or it may flow directly to an IOMMU 216 for service. The device processing complex 258 may represent a general purpose APD, such as APD 104, I/O devices such as I/O devices 250, 252, and 254, or other specialized computational engine, as discussed herein.

In embodiment of the present invention, data access can originate with the CPU 202 or with the device processing complex 258. Data access can terminate in a local memory access from local memory 268 or in a system access from memory 206. In an exemplary implementation, IOTLB 264 functionality can be added that uses ATS for translation efficiency. PPR/PRI support can be added for advanced function and efficiency. The ATS/PRI advanced functionality is represented by element number 262. A peripheral may provide a private MMU such as private MMU 260 function for custom address translation and access control.

By way of example, implementation of peripheral local memory 268 can be unique to each device. Generally, however, this implementation desirably ensures that each device will preserve the following system properties:

1. Accesses from the device processing complex 258 to memory 206 are processed by the private MMU 260 or by the IOMMU 216 to enforce the policy required of the guest translation.

2. Accesses from the device processing complex 258 to memory 206 are processed by the IOTLB 264 (which may use ATS and/or PRI requests 262) or by the IOMMU 216 to enforce the policy required of the nested translation.

3. Accesses to peripheral local memory 268 from the CPU 202 or the device processing complex 258 are processed by the private MMU 260 to enforce the policy required of the guest translation.

4. Accesses to peripheral local memory 268 from the CPU 202 or the device processing complex 258 are processed by the local memory protection Map 266 to enforce the policy required of the nested translation.

Figure 3A:
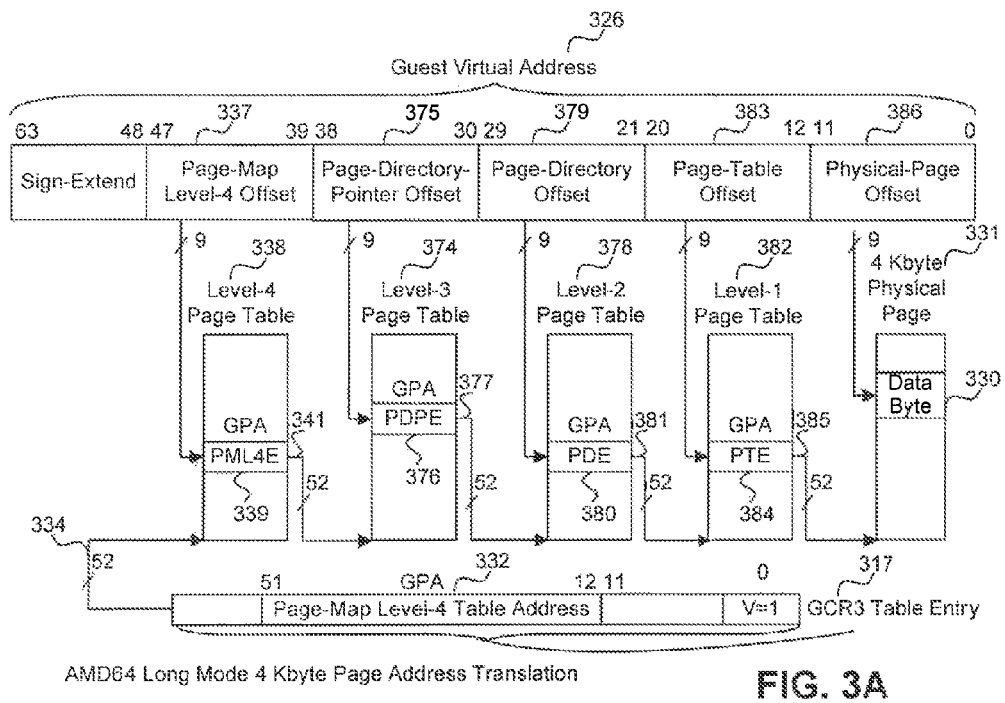
FIG. 3A is an exemplary block diagram of a first layer of an IOMMU nested paging transaction system according to an embodiment of the present invention.
Figure 3B:
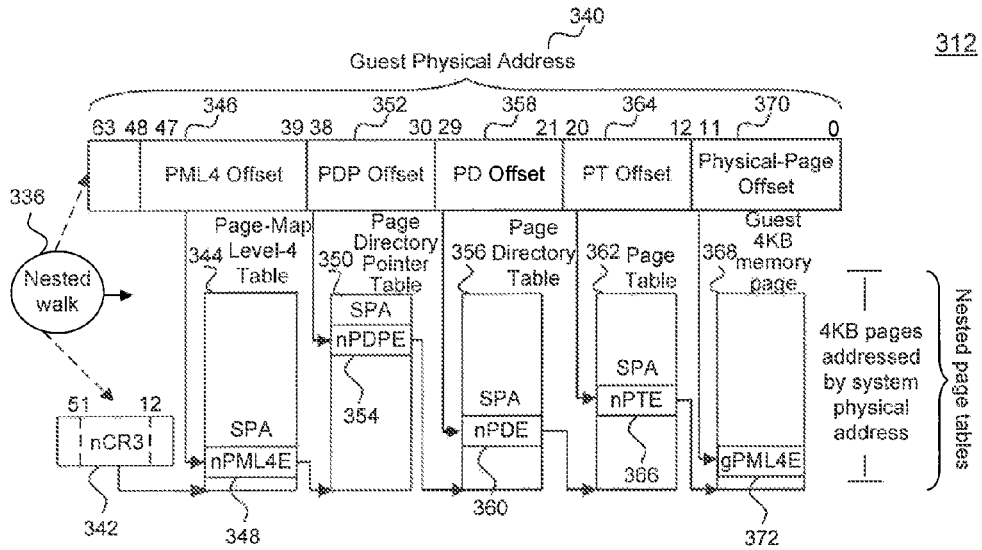
FIG. 3B is an exemplary block diagram of a second layer of an IOMMU nested paging transaction system according to the embodiment.

FIGS. 3A and 3B, represented by 314 and 312, respectively, function together as is an illustrative block diagram of a two-layer address translation system in accordance with the illustrative embodiment of FIG. 2. More specifically, the system includes a guest address translation table structure 314 and a system address translation table structure 312, as set up in I/O page tables 224 data structure. A four-level page table structure is illustrated and used to access a 4 Kbyte physical page 331. Embodiments of the present invention provide page table structures using greater or fewer levels (e.g., a three-level page table structure referencing a 2 Mbyte physical page; a two-level page table structure referencing a 1 Gbyte physical page; etc.).

A GVA may be provided by an I/O device issuing an address translation transaction (e.g., a request for ATS). Ultimately, the GVA may be translated to an SPA associated with accessing data byte 330.

The GCR3 table entry 317 includes a page-map level-4 (PML4) table address 332. Although the PML4 table address 332 corresponds to a root page table pointer 334, the PML4 table address 332 is in a format of a GPA. The systems 314 and 312 function together to perform a nested walk 336 to convert the PML4 table address 332 from the GPA format to the SPA format. The SPA corresponds to the system physical address of a root of the level-4 page table 338. Thus, the heavy black lines associated with, e.g., the root page table pointer 334, may represent an SPA obtained using a nested walk 336.

The level-4 page table 338 is identified using root page table pointer 334, and entries of the level-4 page table 338 are indexed using a page-map level-4 (PML4) offset 337. The PML4 offset 337 is associated with bits 39-47 of a GVA 326 that is to be translated. Accordingly, PML4 entry (PML4E) 339 is located using the root page table pointer 334, the level-4 page table 338, and the PML4 offset 337. When a guest attempts to reference memory using the GVA 326, because PML4E 339 is a GPA, systems 314 and 312 work together to convert PML4E 339 to an SPA using the nested walk 336.

To complete the nested walk 336, system 312 can be implemented using I/O page table 224 structures set up in memory 206 to perform GPA-to-SPA conversions for each of the GPAs from the guest address translation table structure 314. For example, a GPA 340 may be loaded with the PML4E 339 for conversion to obtain a corresponding SPA for a root page table pointer 341. The GPA 340 includes offsets used to index the various tables of the system address translation table structure 312.

The nested walk 336 uses an nCR3 342 associated with a PML4E 339 to locate a root of page-map level-4 (PML4) table 344. A PML4 offset 346 (bits 39-47 of GPA 340) is used to index into the PML4 table 344 and obtain the entry nPML4E 348. The nPML4E 348 points to a root of page directory pointer (PDP) table 350, and a PDP offset 352 (bits 30-38 of GPA 340) is used to index into the PDP table 350 and obtain an entry nPDPE 354.

The nPDPE 354 points to the root of a page directory (PD) table 356, and a PD offset 358 (bits 21-29 of GPA 340) is used to index into the PD table 356 and obtain an entry nPDE 360. The nPDE 360 points to a root of page table 362, and a PT offset 364 (bits 12-20 of GPA 340) is used to index into the page table 362 and obtain an entry nPTE 366. The nPTE 366 points to the root of guest 4 KB memory page 368, and a physical page offset 370 (bits 0-11 of GPA 340) is used to index into guest 4 KB memory page 368 and obtain an entry gPML4E 372. The gPML4E 372 is an SPA value corresponding to the GPA PML4E 339 and used by a root page table pointer 341 to locate a level-3 page table 374 in the guest address translation table structure 314.

The level-3 page table 374 is indexed using a PDP offset 375 to obtain a PDPE 376 (GPA format). The nested walk 336 is used to convert the GPA PDPE 376 into an SPA value corresponding to a root page table pointer 377. The root page table pointer 377 is used to locate a level-2 page table 378, which is indexed using a page-directory offset 379 (bits 21-29 of GVA 326) to obtain a PDE 380 (GPA format). The nested walk 336 is used to convert the GPA PDE 380 into an SPA value corresponding to a root page table pointer 381.

In embodiments of the present invention, root page table pointer 381 is used to locate a level-1 page table 382, which is indexed using a page-table offset 383 (bits 12-20 of GVA 326) to obtain a PTE 384 (GPA format). The nested walk 336 is used to convert the GPA PTE 384 into an SPA value corresponding to a root page table pointer 385. The root page table pointer 385 is used to locate the 4 Kbyte physical page 331, which is indexed using a physical page offset 386 (bits 0-11 of GVA 326) to obtain the data byte 330.

Thus, systems 314 and 312 use nested cascades of page table walks to perform two-layer GVA-to-GPA and GPA-to-SPA address translations. Although two layers of nested address translation are shown, additional layers may be implemented using similar nested/recursive calls. The translations associated with system address translation table structure 312 and guest address translation table structure 314 may be implemented in hardware. One set of hardware may be used for both sets of translations, although separate hardware may be provided for each set of the guest/system translations.

As noted above, one of the challenges associated with conventional multiple processing device computing systems is the overhead associated with maintaining separate memory systems and/or driver management related to shared memory systems. One example of this overhead in conventional multiple processing device systems is the requirement to accommodate two or more copy commands when sharing a single set of data between the multiple processing devices.

FIG. 4 is an illustrative block diagram 400 of a memory copy transaction in a conventional system using two separate copy commands. For convenience, memory 402, and APD or other I/O device 406 are substantially similar to memory 206 and APD 104 or other I/O devices 250, 252, and 254, and are not described again.

In addition to address translation, the IOMMU 216 provides access protection on DMA transfers by I/O devices. Further, IOMMU 216 provides for secure user-level application to select I/O devices. Also, IOMMU 216 provides for secure VMVM guest OS access to select I/O devices.

The requirement to perform multiple copy commands, as illustrated in FIG. 4, creates unnecessary system overhead. For example, a separate bounce buffer, which can be viewed as a software construct, is usually required to accommodate multiple copy commands. Traditionally, bounce buffers are located in low system memory for DMA traffic for devices that do not support 64-bit addressing. The OS may copy DMA data to or from the bounce buffer to an actual buffer in high memory used by the I/O driver. In an example, this technique requires system memory to copy data (e.g., image data), received from one processing device, to another processing device (or local I/O device) memory 406 where it can be manipulated. Copying to local device memory 406 is represented by numeral 404. Numeral 408 represents an operation (e.g., computations, subroutine execution, or some functions) performed on the image data. As represented by numeral 410, when the operation is completed, the image data must then be copied back to system memory 402.

The IOMMU 216 may enable significant enhancements to system level software. For example, one enhancement provides for legacy 32-bit I/O device support on 64 bit systems. This enhancement does not require bounce buffers and expensive memory copies. Thus, overhead associated with copy commands is reduced.

Figure 5:
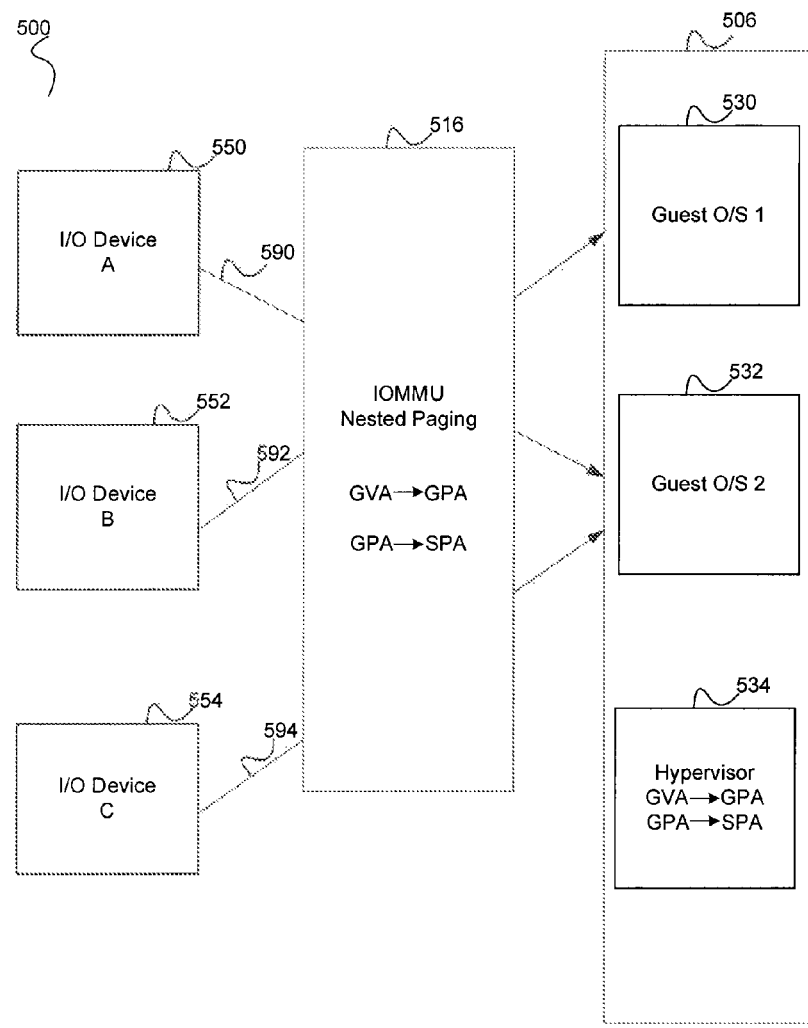
FIG. 5 is a block diagram of a direct device assignment scheme in which embodiments of the present invention can be applied.

FIG. 5 is an illustrative block diagram 500 of an efficient memory management system that eliminates the need for the separate copy commands illustrated in FIG. 4.

In FIG. 5, IOMMU 516, memory 506, guest OSs 530 and 532, and hypervisor 534 are each substantially similar to the IOMMU 216, memory 206, guest OSs 230 and 232, and hypervisor 235, respectively. Further, I/O devices 550, 552, and 554 are substantially similar to APD 104 or other I/O devices 250, 252, and 254. Thus, for convenience, the descriptions of similar elements in FIGS. 2 and 5 will not be repeated.

Also in FIG. 5, numerals 590, 592, and 594 represent DMA requests sent by exemplary I/O devices 550, 552, and 554, respectively. The nested paging transactions provided by IOMMU 516 provide for the exemplary I/O devices 550, 552, and 554 to take some element of an operation (e.g., computations, subroutine execution, or some functions) and permit the system to efficiently accommodate the operation through direct manipulation.

In one exemplary embodiment, through direct manipulation the APD, or other I/O device(s), can directly manipulate memory 506, which may contain the image data, while the image data is still in memory 506. This direct manipulation of memory 506 enables the memory 506, and the I/O devices 550, 552, and 554 to operate out of the same guest virtual address space. In this example, IOMMU 516 can use mapped guest pointers to facilitate direct access to memory 506 by I/O devices 550, 552, and 554. This eliminates the need for the memory 506 to first copy data (e.g., image data) to the I/O devices 550, 552, and 554, prior to data manipulation or after completion of any operation on the data. Eliminating these additional copy maneuvers via direct memory manipulation, and other enhancements described herein, enables improved efficiency and reduction of overhead associated with data copies.

Figure 6:
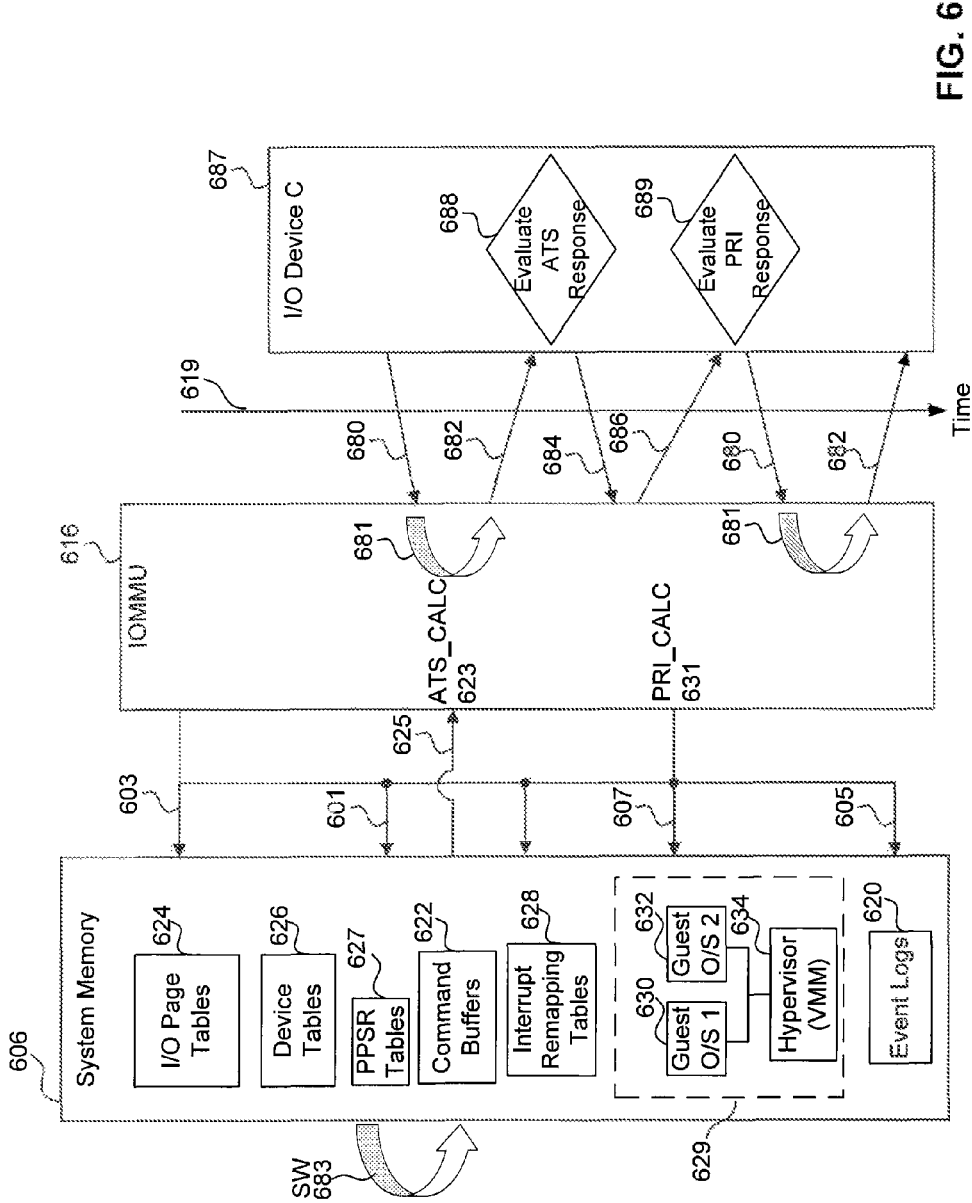
FIG. 6 is an illustration of an I/O device page faulting and resolution schemes in which embodiments of the present invention can be applied.

FIG. 6 is operational flow diagram 600, according to another aspect of the present invention. In the example shown, system 600 includes memory 606, IOMMU 616, and a peripheral device 687, which are substantially similar to respective memory 206, IOMMU 216, and I/O device 254.

In one example, memory 606 includes event logs 620, command buffers 622, I/O page tables 624, device tables 626, PPSR queue 627, interrupt remapping tables 628, guest OS 630, guest OS 632, and hypervisor 634. These elements are similar to those described in FIG. 2. An ATS request 680, ATS response 682, PRI request 684, and PRI response 686 are more detailed illustrations of ATS/PRI 262, introduced in accordance with exemplary FIG. 2. Peripheral 687 can be configured to evaluate ATS responses as represented by numeral 688 and can be configured to evaluate PRI responses, as represented by numeral 689.

Another aspect of the present invention provides for an ATS used by peripheral 687 to translate a GPA to an SPA. In FIG. 6, an ATS provides secure, device-initiated address translations for virtualization. To translate a GPA to an SPA, a PCI-E-connected peripheral 687 issues an ATS request 680 (a PCI SIG Specification) with or without a PASID TLP prefix recognized by the IOMMU 616. IOMMU 616 evaluates access privileges using cached information from IOTLB 264 and/or by walking the page tables using table walker 244, when required. The IOMMU 616 is configured to determine 681 the result of an ATS 680 request and the resulting access privileges are returned in the ATS response 682 without requiring intervention by the processor and/or hypervisor 634.

Further, address translation services can be requested by peripheral 687 to translate a GVA or GPA to an SPA. To translate a GVA to an SPA, peripheral 687 connected by PCIe issues an ATS request 680 containing a valid PASID to present flags (e.g. access and dirty bit status) and a canonical virtual address. An integrated peripheral 687 may use means other than the ATS protocol to present flags and the virtual address, such as wire signals. The IOMMU 616 evaluates access privileges using IOTLB 264 cached information for efficiency, and can walk the page tables using table walker 244, when required. To match AMD64 semantics, the IOMMU can rewalk the guest page tables, I/O Page Tables 624, if previously cached information indicates insufficient privileges for the access. The resulting access privileges are returned 681 in the ATS response 682. To carry the additional information for a guest address, the IOMMU 616 uses a PCIe TLP prefix containing a valid PASID.

The IOMMU 616 must update the accessed and dirty bits (not shown) in the GVA page table, I/O page tables 624, while servicing an ATS request 680 as if the peripheral 687 had actually accessed memory. For the purpose of evaluating GVA accessed and dirty bits, the IOMMU 616 can use the access level indicated in the ATS packet (not shown) of ATS request 680. An ATS request 680 for read-only access can determine the accessed bit setting and an ATS request 680 for read-write access can determine the dirty bit setting. When processing a GPA, the IOMMU 616 can treat the page tables as read-only.

Further, software issues an INVALIDATE_IOTLB_PAGES command to cause the IOMMU 616 to generate an invalidation request to peripheral 687. An invalidation request sent downstream to the peripheral 687 lacks a valid PASID prefix when the contents are a GPA. An invalidation request sent downstream to peripheral 687 has a valid PASID prefix when the contents are a GVA and the PASID is in the PASID TLP prefix.

The conditions under which peripheral 687 with an IOTLB 264 must invalidate a cached translation entry that caused an insufficient-privilege failure and obtain a fresh translation using ATS are now explained.

Peripheral 687 can use address translation information from the IOTLB 264 or obtained via ATS to determine access privileges for a nested (host) access. As an AMD extension, peripheral 687, with IOTLB 264, can invalidate a cached entry causing an insufficient-privilege failure when both the access bit and the dirty bit are set to "1" in the IOTLB entry for a guest access. Peripheral 687 must then request the guest translation information using ATS and retry the access. If the revised privileges are insufficient for the retry, peripheral 687 must take appropriate action to abandon the access or issue a PCI-E PRI request 684 for escalated privileges.

In the case of ATS, the IOMMU 616 has all the information needed to determine 681 a result to send back in an ATS response 682. However, in the case of PRI, the PRI request is passed on to the guest OSs 630 and 632, the hypervisor 634, and/or software (SW) to assist in determining 683 a result for PRI response 686. For example, PRI request 684 requires software policy decisions to be made by the guest OSs 630 and 631, and/or the hypervisor 634. PRI, a PCI-Sig specification, allows peripheral 687 to request memory management services from exemplary VM block 629 (e.g., software).

Further, the IOMMU 616 optionally supports PRI specification as a complement to the PCI-SIG ATS specification. PRI offers peripheral page fault support in conjunction with ATS. The IOMMU 616 support for PRI is the PPR service.

In traditional systems, the OS is required to pin the memory pages used for I/O. Pinned memory refers to memory pages that are to be maintained in real memory all the time. Pinning a memory page prohibits the pager from stealing the memory page for other uses. A memory page must typically be pinned before DMA starts and may be unpinned when DMA completes. The pinned pages are often allocated from a separate memory pool of limited capacity.

ATS and PRI can be used together to enable peripheral 687 to use unpinned pages for I/O. When processing ATS requests 680, the IOMMU 616 does not signal errors when insufficient access privileges or not-present pages are detected. Instead, IOMMU 616 returns the permissions calculated from the I/O page tables 624. Peripheral 687 examines the PRI response 686 to determine an appropriate action (e.g., use PRI to request system software to service a page table entry in I/O page tables 624). Use of peripheral page request service (PPR)/PRI allows peripheral 687 to request the OS to change the access privileges of the I/O page table 624 page. Use of ATS with PPR can allow a system to operate efficiently in a reduced memory footprint.

In exemplary operation of the present invention, IOMMU 616 is implemented to provide memory to peripheral 687 when no memory 606 is physically available to service a DMA job request. For example, if peripheral 687 sends ATS request 680 and the memory is not physically available in memory 606, typically a page fault may result. The page fault may be represented by a signal from command buffers 622 to IOMMU 616 in response to a memory access attempt via ATS_Calc 623.

Also, if peripheral 687 is ATS-capable, peripheral 687 can issue PRI requests 684 to IOMMU 616. PRI request 684 is received by the IOMMU 616, which sends signal 631 to system block 629 including the guest OS 630, guest OS 632, and hypervisor 634 in response to the PRI Request 684 since software policy 683 is needed to calculate the PRI Response 686. Hypervisor 634 takes priority over guest OSs 630 and 632 for handling IOMMU signal PRI_Calc 631, and has the first right of refusal to process PRI_Calc 631, prior to passing processing of PRI_Calc 631 over to the Guest OSs 630 and 632. If peripheral 687 sends PRI request 684 and the memory is not physically available in memory 606, typically a page may fault result. The page fault may be represented by a signal from command buffers 622 to IOMMU 616 in response to a memory access attempt via PRI_Calc 631.

If a page fault results, IOMMU 616 is configured to send ATS_Calc 623 or PRI_Calc 631 to the PPSR tables 627 (e.g. PPR Queue). This is because when the IOMMU 616 receives a valid PRI request 684, it creates a PPR message to request changes to the virtual address space. Software policies in place in the VM block 629 may resolve page fault issues by swapping in a page, allocating new pages, rejecting the request, upgrading security privileges, providing copy-on-write operations, or by any other accommodation for preventing a definitive page fault.

An IOMMU 616 that supports PPR may report PPI requests to the host software 683 by means of a shared circular buffer (not shown) in memory 606. The IOMMU 616 may write the I/O device's PPR records into the buffer when enabled. The host software 683 increments the IOMMU 216's PPR request log head pointer (not shown) to indicate to the IOMMU 616 that the host software 683 has exhausted PPR request log entries. When software 683 has completed processing the PPR requests 601, PPR queue 627 uses an IOMMU job completion command to inform the I/O device 687 of the results.

When an IOMMU 616's request to memory 606 for more memory is honored, one of the guest OSs 630 or 632 in virtual block 629 may copy a disk page (i.e. physical memory) into the memory 606 only if an attempt is made to access a page in memory 606 that is not physically present in memory 606 (i.e. an I/O page table 624 page has not yet been loaded by the OS).

Generally, when an application 211 begins to process, none of its pages are in memory. It follows, many page faults may occur before the application 211's essential pages necessary to carry out the DMA operation are loaded into memory 606 in connection with the PRI response 686. When the virtual memory block 629 operates to load only the necessary pages for the DMA operation, it follows that more processes in the virtual block 629 are permitted to be loaded as a consequence. When more processes are allowed to be loaded in virtual block 629, the amount of time needed for loading a GCR3 register, as discussed in the aforementioned U.S. Patent Application No. 61/423,062, entitled "Input/Output Memory Management Unit Two-Layer Addressing," is reduced.

Once software policy 683 has been instituted by VM block 629, the command buffers 622 notify the IOMMU 616 as represented by arrow 625. The IOMMU 616 transmits an ATS response 682 or PRI response 686 to the IOMMU 616. Peripheral 687 evaluates the resulting ATS response 682 and PRI response 686, as represented by numerals 688 and 689, respectively. Or, the IOMMU 616 may write to the event logs 620 if there is no resolution, resulting in a definitive page fault.

Figure 7:
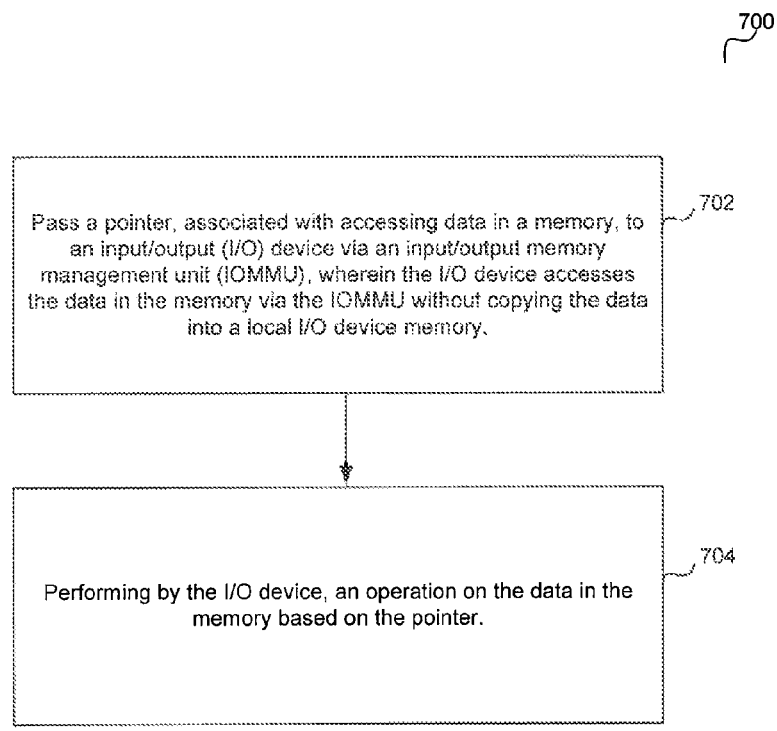
FIG. 7 is a block diagram of a flow chart illustrating efficient memory and resource management, in accordance with the present invention.

FIG. 7 is an illustration of an exemplary method 700 of practicing an embodiment of the present invention. In method 700, step 702 illustrates passing a pointer, associated with accessing data in memory 402, to an I/O device 406 via the IOMMU 216. The I/O device accesses the data in the memory via the IOMMU, without needing to copy the data into I/O device memory that is local to that I/O device.

Step 704 illustrates performing, by the I/O device, an operation on the data in the memory based on the pointer. The IOMMU 216 can control the I/O device 406 based on the pointers passed by the IOMMU 216. The I/O device 406 accesses memory 402. This operation does not need to perform a copy operation 404 of data in the memory 402 into I/O device 406's local memory 266. There is also no need for a copy operation 412 of the data operated on 410 to be copied back to memory 402.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:
1. A method comprising:
  receiving, by an I/O device, a mapped pointer, the mapped pointer pointing to data residing in a system memory, wherein the mapped pointer is received via an input/output memory management unit (IOMMU);

accessing, by the I/O device, the data in the system memory via the IOMMU without copying the data into a local memory of the I/O device memory; and performing, by the I/O device, an operation on the data directly in the system memory based on the mapped pointer; and nested paging transactions provided from the IOMMU.

2. The method of claim 1, wherein the IOMMU is configured to pass the mapped pointer without needing intervention by a hypervisor or guest operating system (OS).

3. The method of claim 1, wherein the mapped pointer is configured to be usable by the I/O device, and a process running in a virtual machine, without reconfiguring the pointer.

4. The method of claim 1, wherein the data comprises image data.

5. The method of claim 1, wherein the system memory and the I/O device operate out of a same guest virtual address space to provide for direct manipulation by the guest OS of the data in the system memory.

6. The method of claim 1, wherein the performing comprises:
using nested translation information from the nested transactions without using a guest translation layer,
wherein the guest translation layer is implemented for separation of a guest process and the I/O device.

7. An apparatus comprising:
an input/output memory management unit (IOMMU) configured to:
pass a mapped pointer, the mapped pointer pointing to data residing in a system memory, to an input/output (I/O) device, wherein the I/O device accesses the data in the system memory via the IOMMU without copying the data into a local I/O device memory and
provide, to the I/O device nested paging transactions, wherein the mapped pointer and nested transactions are configured to enable the I/O device to perform an operation on the data in the system memory.

8. The apparatus of claim 7, wherein the IOMMU is configured to pass the mapped pointer without needing intervention by a hypervisor or guest operating system (OS).

9. The apparatus of claim 7, wherein the mapped pointer is configured to be usable by the I/O device, and a process running in a virtual machine, without reconfiguring the mapped pointer.

10. The apparatus of claim 7, wherein the data in the system memory comprises image data.

11. The apparatus of claim 7, wherein the system memory and I/O device operate out of a same guest virtual address space to provide for direct manipulation by the guest OS of the data in the system memory.

12. The apparatus of claim 7, wherein:
nested translation information from the nested transactions is used without using a guest translation layer; and
the guest translation layer is implemented to separate a guest process and the I/O device.

* * * * *